US 8,246,849 B2

(12) United States Patent
Akiho (10) Patent No.: US 8,246,849 B2
(45) Date of Patent: Aug. 21, 2012

(54) MAGNETIC POWDER PRODUCTION METHOD

(75) Inventor: Hiraku Akiho, Tokyo (JP)

(73) Assignee: Sony Corporation, Tokyo (JP)

(*) Notice: Subject to any disclaimer, the term of this patent is extended or adjusted under 35 U.S.C. 154(b) by 93 days.

(21) Appl. No.: 12/740,210

(22) PCT Filed: Nov. 10, 2008

(86) PCT No.: PCT/JP2008/070431
§ 371 (c)(1),
(2), (4) Date: Apr. 28, 2010

(87) PCT Pub. No.: WO2009/063834
PCT Pub. Date: May 22, 2009

(65) Prior Publication Data
US 2010/0257725 A1 Oct. 14, 2010

(30) Foreign Application Priority Data
Nov. 16, 2007 (JP) ................ P2007-298653

(51) Int. Cl.
*H01F 1/11* (2006.01)
(52) U.S. Cl. .............. 252/62.57; 252/62.59; 29/600
(58) Field of Classification Search ....... 29/25.41–25.42, 29/600, 592.1; 252/62.51 R, 62.54–62.55; 148/100–105; 427/213.31, 313.3, 216, 221; 428/838, 405, 323
See application file for complete search history.

(56) References Cited

U.S. PATENT DOCUMENTS

| 5,256,326 | A | * | 10/1993 | Kawato et al. | 252/62.54 |
| 5,271,857 | A | * | 12/1993 | Ino et al. | 252/62.54 |
| 5,350,558 | A | * | 9/1994 | Kawato et al. | 419/35 |
| 5,683,617 | A | * | 11/1997 | Inuzuka et al. | 252/62.56 |
| 6,758,986 | B1 | * | 7/2004 | Hosokawa et al. | 252/62.57 |
| 6,964,811 | B2 | * | 11/2005 | Kishimoto et al. | 428/402 |
| 7,510,790 | B2 | * | 3/2009 | Kishimoto et al. | 428/842.9 |

FOREIGN PATENT DOCUMENTS

| JP | 2-096302 | 4/1990 |
| JP | 2001-210924 | 8/2001 |
| JP | 2001-284118 | 10/2001 |
| JP | 2003-234227 | 8/2003 |

OTHER PUBLICATIONS

International Search Report issued on Feb. 17, 2009 for correspond PCT/JP2008/070431.

* cited by examiner

Primary Examiner — Minh Trinh
(74) Attorney, Agent, or Firm — K&L Gates LLP (57) ABSTRACT

To provide a magnetic powder production method, a magnetic sheet production method, and an antenna module production method that are capable of reducing a size of magnetic particles, achieving thinning and a low loss, and improving magnetic permeability without lowering it. At least two oxide-based magnetic materials are mixed, preliminarily calcined, and pulverized. The pulverized magnetic materials are typically formed into a paste by being dispersed in an organic solvent, and the magnetic materials are applied onto a film after being subjected to defoaming processing. Accordingly, a sheet-like magnetic material is formed. The sheet-like magnetic material is cut into predetermined sizes so as to be fragmented into particles, with the result that magnetic particles are formed.

2 Claims, 12 Drawing Sheets

| | ferrite-Spherical | ferrite-Flat |
|---|---|---|
| $\mu'$ | 19.0 | 35.0 |
| $\mu''$ | 0.0 | 0.1 |
| Q | 293 | 198 |
| $\mu \times Q$ | 5583 | 6930 |

| Do | t | Aspect ratio | $\mu'$ |
|---|---|---|---|
| 0.8 | 0.03 | 26.7 | 39 |
| 0.4 | 0.12 | 3.3 | 24 |
| 0.4 | 0.06 | 6.7 | 26 |
| 0.4 | 0.03 | 13.3 | 33 |

MAGNETIC POWDER PRODUCTION METHOD

CROSS REFERENCE TO RELATED APPLICATIONS

The present application is a national stage of International Application No. PCT/JP2008/070431 filed on Nov. 10, 2008 and claims priority to Japanese Patent Application No. 2007-298653 filed on Nov. 16, 2007 the disclosures of which are incorporated herein by reference.

BACKGROUND

The present invention the present invention relates to a method of producing a magnetic powder used in noncontact data communication of, for example, an RFID (Radio Frequency IDentification) system, a magnetic sheet production method, and an antenna module production method.

In an RFID system, a noncontact-type IC tag in which an IC chip having information recorded thereon and a resonance capacitor are electrically connected to an antenna coil is known. As the noncontact-type IC tag, there are also a card type and a type incorporated into a cellular phone and the like.

As an antenna module of the related art that is used for the noncontact-type IC tag, there is one in which a magnetic member (magnetic sheet) is arranged in a planar antenna coil that is spirally wound within a plane such that the magnetic member becomes substantially parallel to the plane of the planar antenna coil. A material having high magnetic permeability is used for the magnetic sheet used in this antenna module. With such a magnetic sheet, an inductance of the planar antenna coil becomes large, and a communication distance is elongated.

Examples of a magnetic material used for the magnetic sheet include ferrite-based magnetic materials such as a Ni—Zn-based material and a Mn—Zn-based material that have Fe as a main component. For example, by mixing and calcining raw materials of oxides such as $Fe_2O_3$, NiO, and ZnO and pulverizing them into appropriate sizes thereafter, a flat ferrite powder is produced (see, for example, Patent Document 1).

The reason why the magnetic particles are flattened is because, when a magnetic device formed of a magnetic material is used in the RFID system, demagnetization of the magnetic particles in the material can be reduced at a time a magnetic field is applied to the magnetic material, with the result that magnetic permeability can be improved.

Patent Document 1: Japanese Patent Application Laid-open No. 2001-284118 (paragraphs [0035] to [0043], FIG. 2).

SUMMARY

Problems to be solved by the Invention

In the manufacturing method of Patent Document 1, pulverization is performed after calcination (900 to 1200° C.). In this case, the magnetic material is deformed during the pulverization, and magnetic permeability of the magnetic material is thus lowered. The lowering of the magnetic permeability leads to lowering of an inductance of an antenna coil and deterioration of performance as an antenna.

In general, for improving the magnetic permeability of the magnetic material, it is necessary to increase a particle size of the magnetic powder to increase a grain size of magnetic particles thereof. However, if a particle size of the magnetic powder is enlarged and thinned and a grain size is also enlarged in a bulk-like oxide-based magnetic material, for example, the particles are prone to breakage. Moreover, a loss at a usable frequency (f=13.56 MHz) becomes large.

In view of the circumstances as described above, it is an object of the present invention to provide a magnetic powder production method, a magnetic sheet production method, and an antenna module production method that are capable of reducing a size of magnetic particles, achieving thinning and a low loss, and improving magnetic permeability without lowering it.

Means for Solving the Problems

For attaining the object above, according to the present invention, there is provided a magnetic powder production method, including: forming a magnetic material including at least two types of oxide-based magnetic materials into a sheet; forming magnetic particles by cutting the magnetic material formed into the sheet such that the magnetic material is fragmented into particles; and calcining the magnetic particles.

In general, magnetic permeability of the magnetic material is practically determined by the calcination eventually carried out in the production process. In the present invention, by divisionally cutting the sheet-like magnetic material, the magnetic particles are size-reduced and flattened, and the particles are calcined thereafter. As a result, a situation where the magnetic material is deformed during pulverization to thus lower magnetic permeability as in Patent Document 1 can be prevented from occurring.

Further, by forming the oxide-based magnetic material into a sheet and cutting it such that it is fragmented into particles, the magnetic material can be size-reduced and flattened before the calcination.

In the present invention, the magnetic powder production method further includes the step of grinding the magnetic particles between the forming of the magnetic particles and the calcining of the magnetic particles. In the present invention, by cutting the magnetic material formed into the sheet such that it is fragmented into particles, the magnetic particles are size-reduced to a certain degree, and an additional size reduction and thinning are realized by the grinding. As a result, in a case where a magnetic device is structured using the magnetic powder, for example, a density of the magnetic particles of the magnetic device can be increased, and high magnetic permeability can be realized.

In the present invention, the grinding of the magnetic particles is carried out by, for example, barreling.

In the present invention, the oxide-based magnetic material is a ferrite-based magnetic material including $Fe_2O_3$ and includes at least one of NiO, CuO, ZnO, $MnO_2$, CoO, and $Sb_2O_3$.

According to the present invention, there is provided a magnetic sheet production method, including: forming a magnetic material including at least two types of oxide-based magnetic materials into a sheet; forming magnetic particles by cutting the magnetic material formed into the sheet such that the magnetic material is fragmented into particles; calcining the magnetic particles; mixing the calcined magnetic particles with at least one of a resin and rubber; and forming the resultant mixture into a sheet. The magnetic sheet is typically used in an antenna module of an RFID system, for example.

According to the present invention, there is provided an antenna module production method, including: forming a magnetic material including at least two types of oxide-based magnetic materials into a sheet; forming magnetic particles by cutting the magnetic material formed into the sheet such that the magnetic material is fragmented into particles; calcining the magnetic particles; mixing the calcined magnetic particles with at least one of a resin and rubber; forming the resultant mixture into a sheet to form a magnetic sheet; processing the magnetic sheet into a predetermined shape; and attaching the processed magnetic sheet to an antenna coil portion.

Effect of the Invention

As described above, according to the present invention, a size reduction of magnetic particles can be achieved without lowering magnetic permeability.

DETAILED DESCRIPTION

Hereinafter, an embodiment of the present invention will be described with reference to the drawings.

Additional features and advantages of the present invention are described in, and will be apparent from, the following Detailed Description and the Figures.

Figure 1:
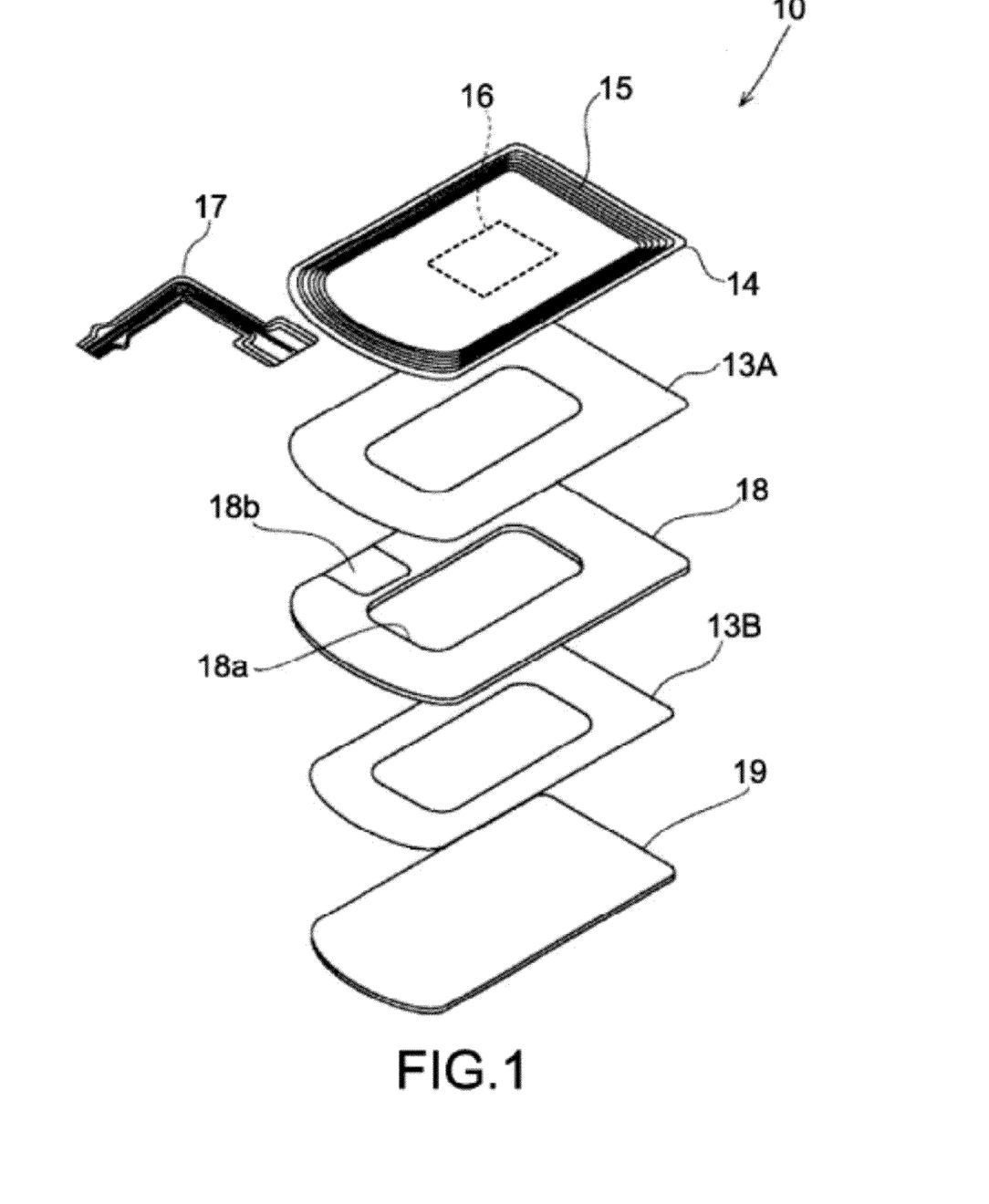
FIG. 1 An exploded perspective view showing a structure of an antenna module including a magnetic sheet produced from a magnetic powder according to an embodiment of the present invention.
Figure 2:
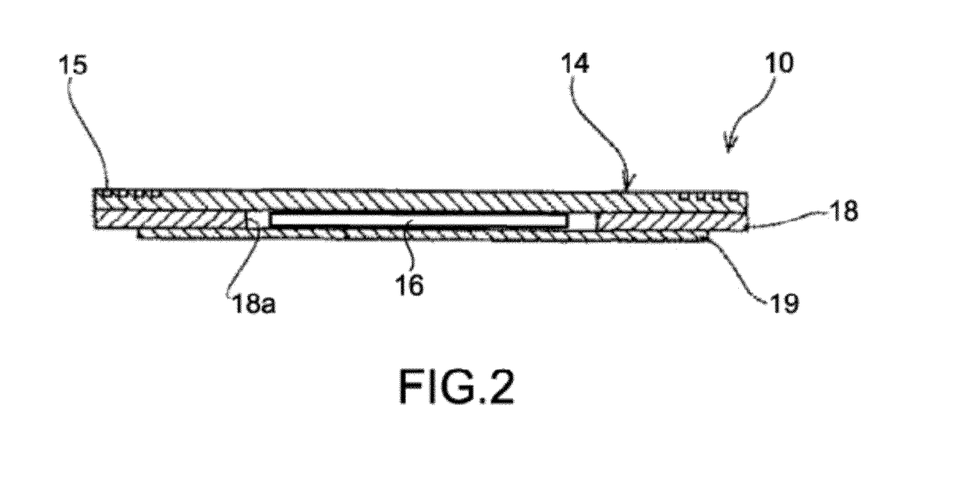
FIG. 2 A cross-sectional diagram showing the antenna module shown in FIG. 1.
Figure 3:
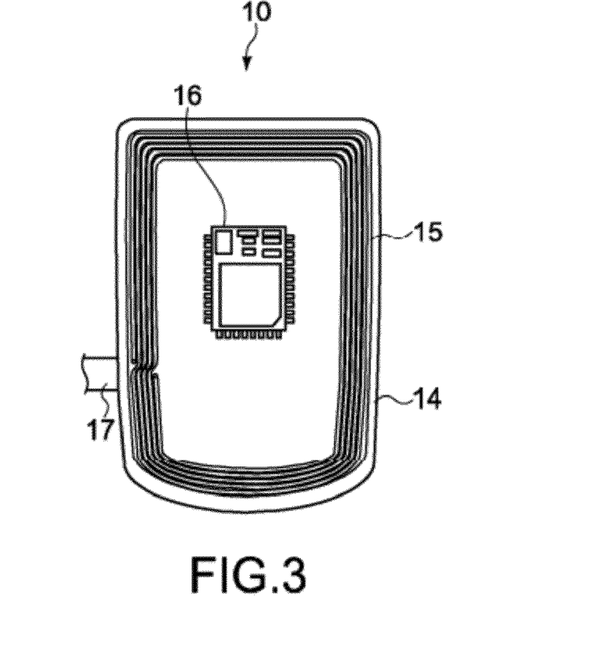
FIG. 3 A plan view showing the antenna module shown in FIG. 1.

FIG. 1 is an exploded perspective view showing a structure of an antenna module including a magnetic sheet produced from a magnetic powder according to an embodiment of the present invention, FIG. 2 is a cross-sectional diagram thereof, and FIG. 3 is a plan view thereof. An antenna module 10 is typically used in an RFID system.

The antenna module 10 has a multilayer structure including a base plate 14, a magnetic sheet 18, and a metal shield plate 19. The base plate 14 and the magnetic sheet 18 are laminated via a double-sided adhesive sheet 13A, and the magnetic sheet 18 and the metal shield plate 19 are laminated via a double-sided adhesive sheet 13B. It should be noted that illustrations of the double-sided adhesive sheets 13A and 13B are omitted in FIG. 2.

The base plate 14 and the magnetic sheet 18 do not need to be bonded by the double-sided adhesive sheet 13 and may instead be bonded by a paste-like adhesive, a liquid adhesive, or the like. Alternatively, the base plate 14 and the magnetic sheet 18 may be attached by other methods.

The base plate 14 is structured by a flexible substrate having an insulation property, that is constituted of a plastic film formed of, for example, polyimide, polyethylene terephthalate (PET), and polyethylene naphthalate (PEN), but may instead be structured by a rigid substrate formed of glass epoxy or the like.

Figure 4:
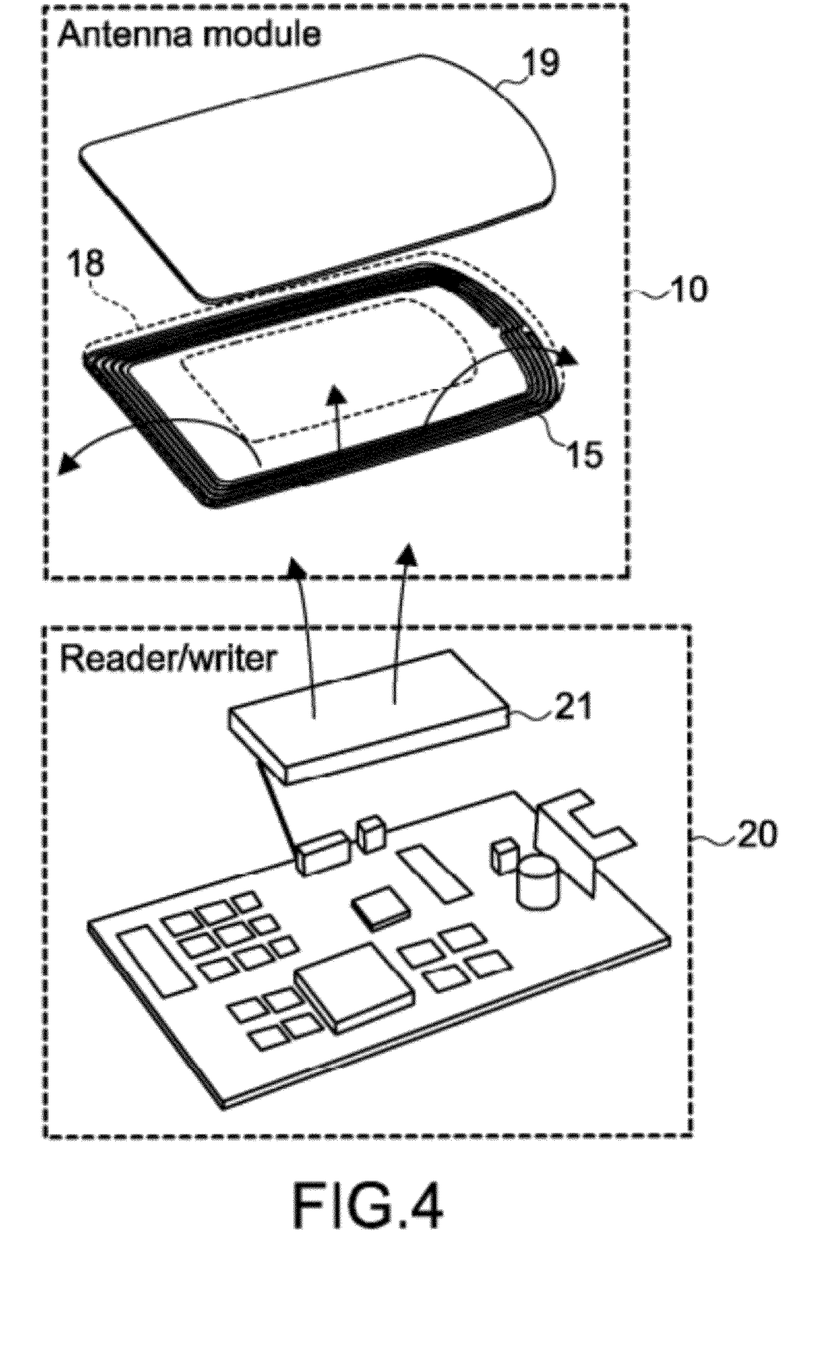
FIG. 4 A diagram showing a state where an external reader/writer is communicating with an antenna portion.

The base plate 14 is equipped with an antenna coil 15 that is wound in loops within a plane. The antenna coil 15 is an antenna coil for a noncontact-type IC tag function and is inductively coupled with an antenna portion 21 of an external reader/writer 20 as shown in FIG. 4 to perform communication. The antenna coil 15 is formed by metal patterns of copper, aluminum, and the like patterned on the base plate 14. The base plate 14 and the antenna coil 15 constitute an antenna coil portion.

In this embodiment, the antenna coil 15 includes a loop portion wound within the plane and a wiring portion for an electrical connection with a signal processing circuit 16 to be described later. However, only the loop portion is shown in FIGS. 1 and 3.

It should be noted that it is also possible to provide a second antenna coil for a reader/writer function in the antenna module 10. In this case, the second antenna coil can be provided on, for example, an inner circumferential side of the antenna coil 15 on the base plate 14, though not limited to this position.

For example, on the magnetic sheet 18 side of the base plate 14 (front surface), the signal processing circuit 16 is mounted. The signal processing circuit 16 is arranged on an inner side of the antenna coil 15 and electrically connected with the antenna coil 15.

The signal processing circuit 16 is a packaged component that stores a signal processing circuit and information requisite for noncontact data communication. The signal processing circuit 16 may either be constituted of a single component or a plurality of components.

When the antenna module 10 is mounted on a mobile terminal apparatus (not shown), the signal processing circuit 16 is connected to a main circuit board or the like of the mobile terminal apparatus (not shown) via an external connection wire 17 attached to the base plate 14. Examples of the mobile terminal apparatus include various apparatuses such as a cellular phone, a portable music player, a PDA (Personal Digital Assistance), and other compact PCs (Personal Computers). The antenna module 10 is not limited to the case of being mounted on the mobile terminal apparatus and may also be mounted on a card as an IC card.

The magnetic sheet 18 functions as a core of the antenna coil 15. The magnetic sheet 18 is also provided a function of preventing an electromagnetic interference from being caused between the antenna coil 15 and the metal shield plate 19 by being interposed between the base plate 14 and the metal shield plate 19 as a lower layer. At a center portion of the magnetic sheet 18, an opening 18a for accommodating the signal processing circuit 16 mounted on the base plate 14 is formed. On one side of the magnetic sheet 18, a relief portion 18b for the external connection wire 17 is formed at the time of lamination with the base plate 14. The magnetic sheet 18 will be described later in detail.

The metal shield plate 19 is formed of a nonmagnetic material such as a stainless steel plate, a copper plate, and an aluminum plate. As will be described later, the antenna module 10 is accommodated in a casing of a mobile terminal apparatus at a predetermined position, for example. Therefore, the metal shield plate 19 is provided to protect the antenna coil 15 from an electromagnetic interference with a metal portion (component, wiring) provided on the main circuit board inside the casing.

The metal shield plate 19 is used for roughly adjusting a resonance frequency (13.56 MHz in this example) of the antenna module 10. In other words, the metal shield plate 19 has a function of preventing the resonance frequency of the antenna module 10 from largely differing between a time the antenna module 10 is used alone and a time the antenna module 10 is incorporated into the mobile terminal apparatus.

In FIG. 1, the antenna coil 15 of the antenna module 10 has been described as a planar-type coil. However, the antenna coil may be provided as follows.

Figure 5:
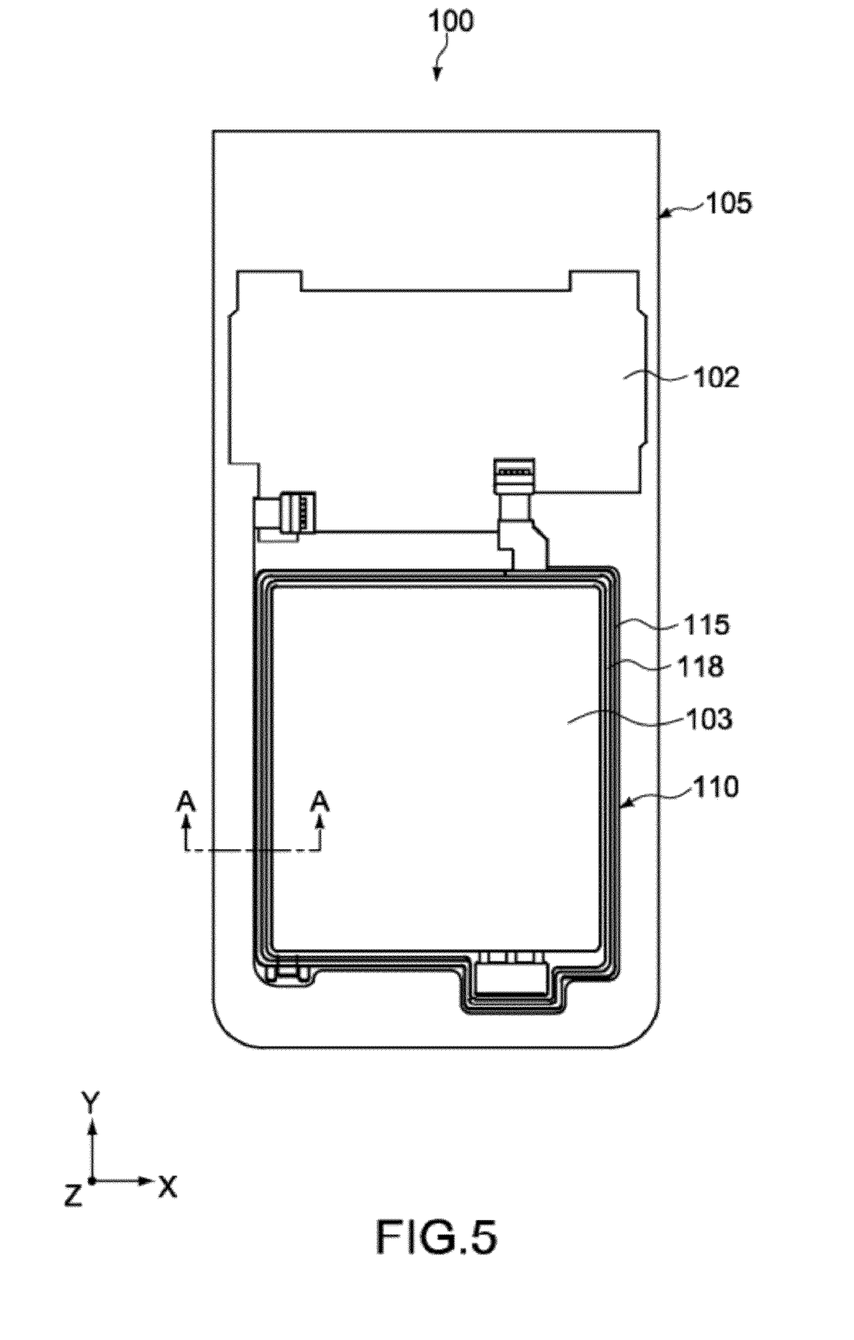
FIG. 5 A schematic diagram showing a part of a cellular phone as a mobile terminal apparatus into which an antenna coil of a type that is not a planar coil is incorporated.

FIG. 5 is a schematic diagram showing a part of a cellular phone 100 as a mobile terminal apparatus into which the antenna coil is incorporated.

The cellular phone 100 includes a main body 105 into which a main circuit board 102 is incorporated and a display portion (not shown). Operation buttons (not shown) and the like are typically provided to the main body 105. As the cellular phone 100, there are various types such as a type in which the main body 105 and the display portion are foldable and a type in which the main body 105 and the display portion slide. There is also a straight type in which the main body 5 and the display portion are integrated.

Although the cellular phone 100 is exemplified as an apparatus into which an antenna module 110 is incorporated, a PDA, a compact PC, other electronic apparatuses, a card, and the like are also possible in addition thereto.

The main body 5 includes a battery pack 103 electrically connected to the circuit board 2, and an antenna coil 115 and a magnetic sheet 118 are provided around the battery pack 103. The antenna coil 115 is electrically connected to an IC chip mounted on the circuit board 2. The antenna coil 115 and the magnetic sheet 118 are elements included in the antenna module 110 used in the RFID system.

Figure 6:
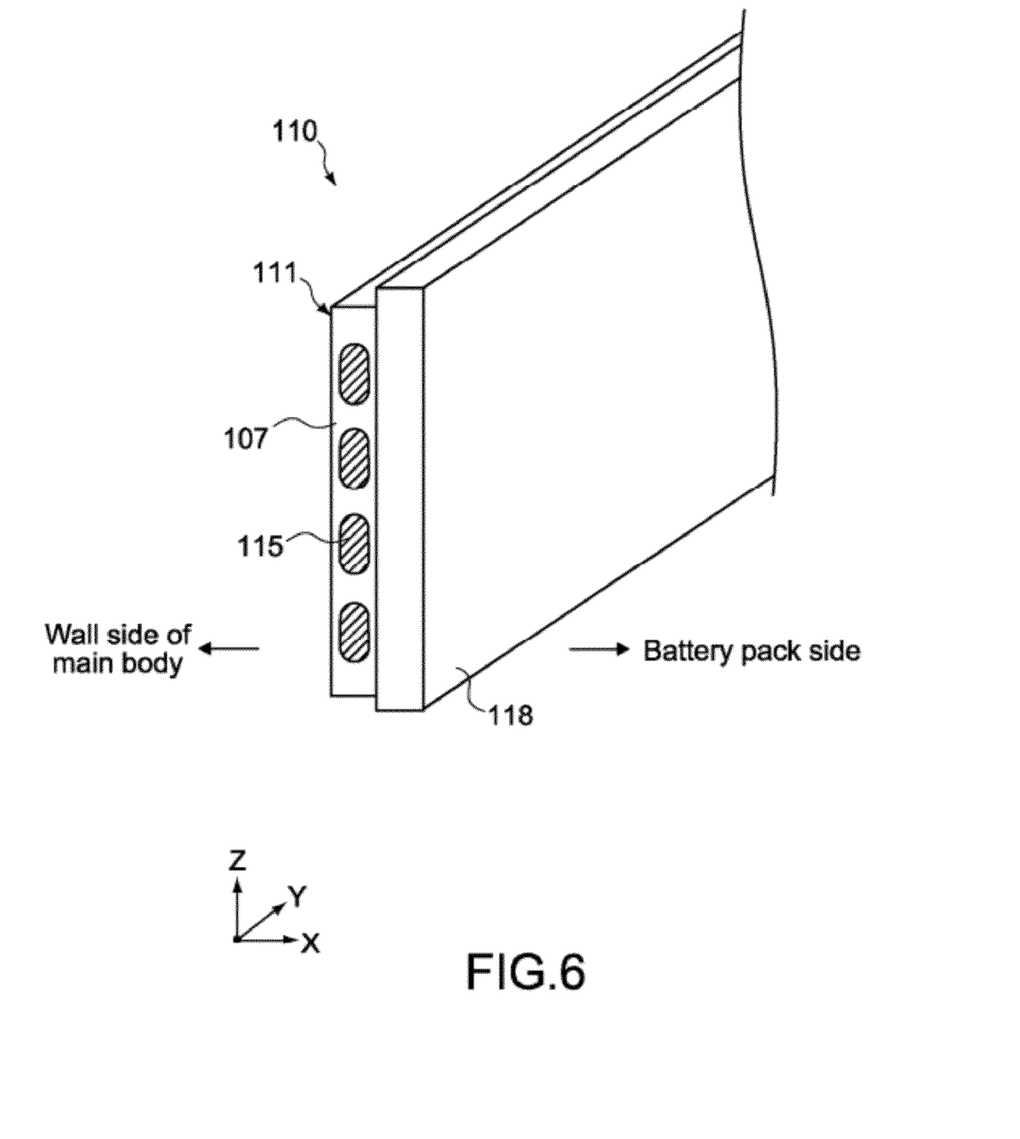
FIG. 6 A cross-sectional diagram taken along the line A-A of FIG. 5, the diagram showing cross sections of the antenna coil and a magnetic sheet.

FIG. 6 is a cross-sectional diagram taken along the line A-A of FIG. 5, the diagram showing cross sections of the antenna coil 115 and the magnetic sheet 118.

The antenna coil 115 is wound a predetermined number of times about an axis in a thickness direction of the main body 105 of the cellular phone 100 (Z direction shown in FIGS. 5 and 6). The antenna coil 115 is integrated by a flexible material 107 such as an FPC (Flexible Printed Circuit) and an FFC (Flexible Flat Cable). Hereinafter, a member formed by integrating the flexible material 107 and the antenna coil 115 will be referred to as antenna cable 111.

The magnetic sheet 118 is interposed between the antenna cable 111 and the battery pack 103 and bonded to the antenna cable 111 by an adhesive sheet or an adhesive, or by other methods. A metal sheet having the same function as the metal shield plate 19 is interposed between the magnetic sheet 118 and the battery pack 103 in some cases.

Figure 7:
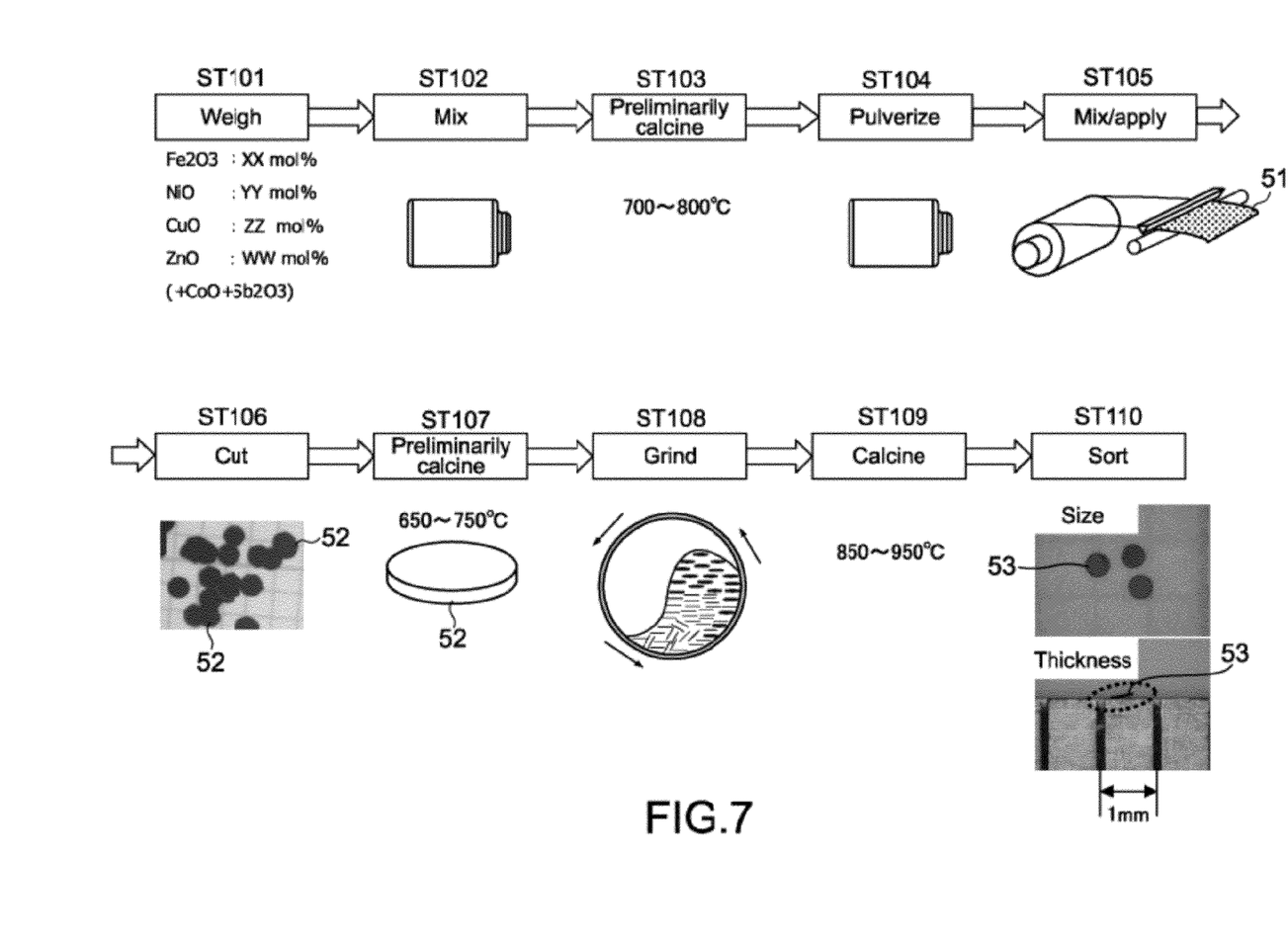
FIG. 7 A diagram for sequentially explaining a method of producing a magnetic powder used in producing a magnetic sheet.
Figure 8:
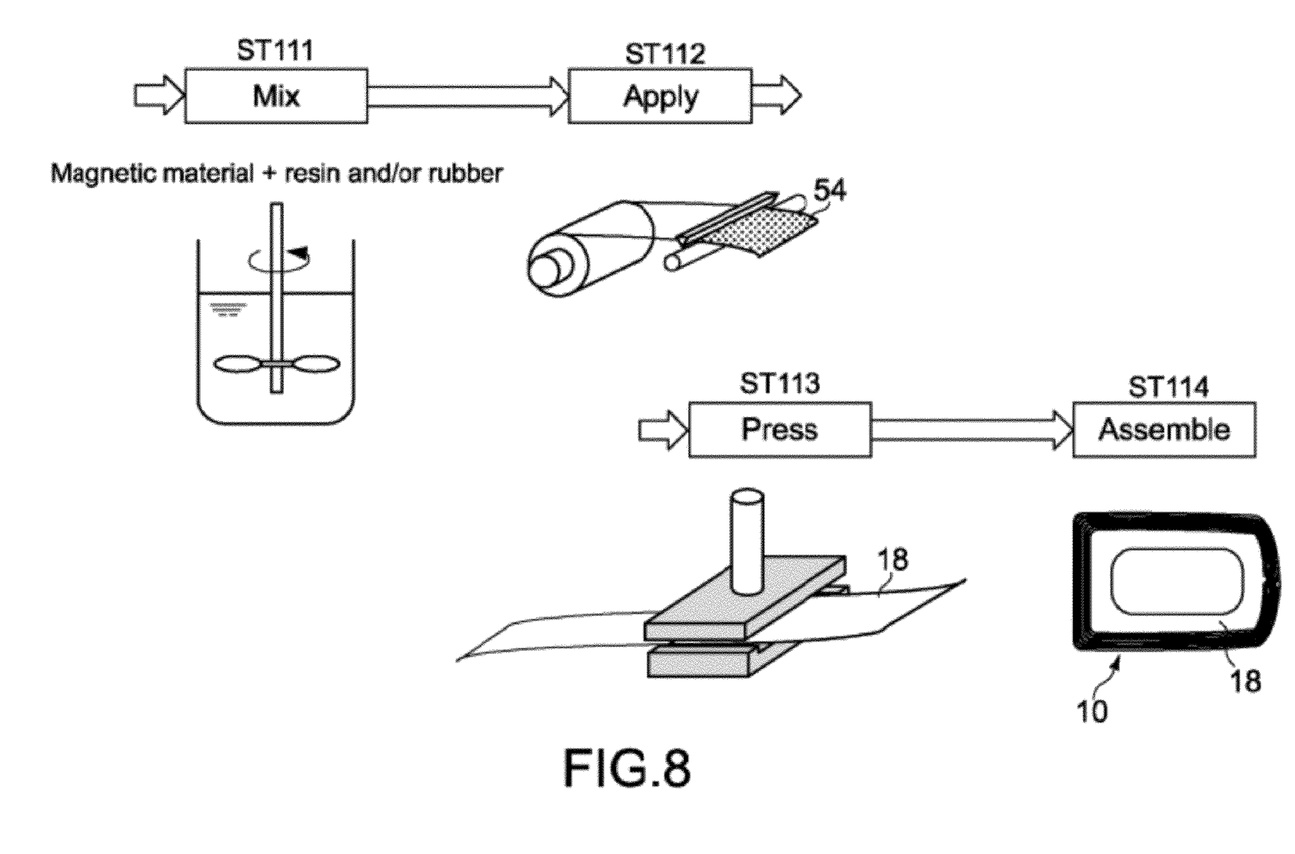
FIG. 8 A diagram showing subsequent steps of FIG. 7.

Next, a method of producing a magnetic powder used in producing the magnetic sheet 18 or 118 will be described. FIGS. 7 and 8 are diagrams for explaining the production method.

Referring to FIG. 7, weighing of a constituent material of a magnetic material is carried out (Step 101). The constituent material is a ferrite-based magnetic material that includes $Fe_2O_3$ and at least one of oxide-based magnetic materials such as NiO, CuO, ZnO, and $MnO_2$.

Figure 9:
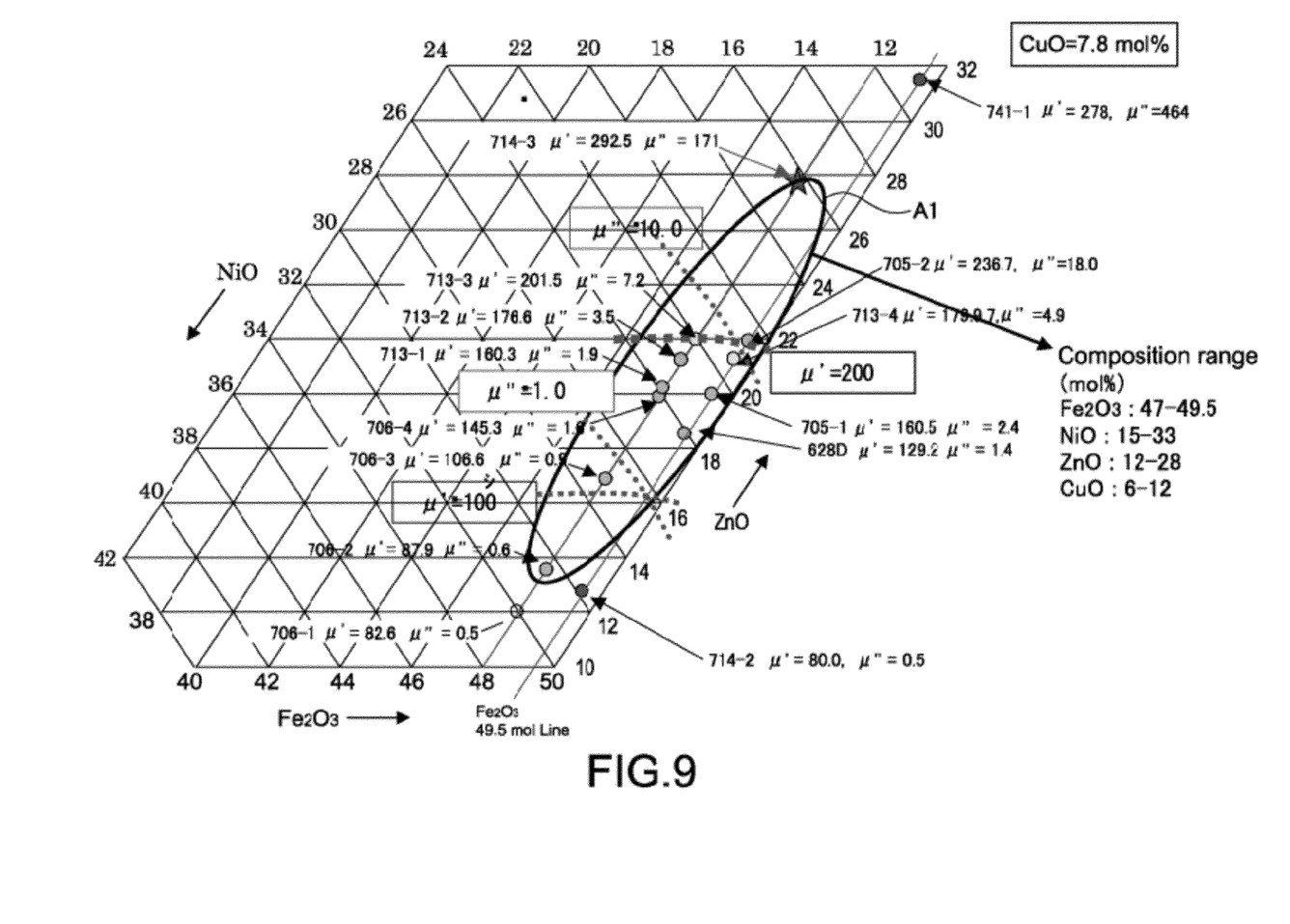
FIG. 9 A composition diagram of a bulk-like magnetic material formed of $Fe_2O_3$, NiO, CuO, and ZnO.

Typically, a magnetic material constituted of $Fe_2O_3$, NiO, CuO, and ZnO is used. FIG. 9 is a composition diagram of the magnetic material constituted of $Fe_2O_3$, NiO, CuO, and ZnO. In the composition diagram, CuO is 7.8 mol % and constant. $\mu'$ and $\mu''$ of a Ni—Zn—Cu ferrite material become smaller as a composition ratio of NiO increases, and a natural resonance frequency can be positioned on a higher frequency side than a usable frequency of the antenna module 10 or 110 (13.56 MHz in this example). In this case, regarding the $\mu''$ component of the magnetic material, a loss by a resonance called residual loss becomes dominant.

Here, magnetic permeability $\mu$ of the magnetic material can be expressed by a real part $\mu'$ and an imaginary part $\mu''$ of complex magnetic permeability of the magnetic sheet 18 or 118 in the usable frequency. Specifically, $\mu=\mu'-i*\mu''$ is established. Moreover, when an inverse number of a loss coefficient $\tan \delta=\mu''/\mu'$ is represented by Q, $\mu'*Q$ is called performance index. $\mu''$ represents a component whose phase is delayed 90 degrees since it was unable to follow an external magnetic field and is called loss term of magnetic permeability.

It should be noted that $\mu'$ and $\mu''$ in the composition diagram shown in FIG. 9 are $\mu'$ and $\mu''$ of a sheet-like magnetic material that have been measured after calcination of Step 109 carried out after Step 105 of FIG. 7 to be described later without performing Steps 106 to 108.

When the usable frequency of the antenna module 10 or 110 is 13.56 MHz, the Ni—Zn—Cu ferrite material used as the magnetic sheet 18 or 118 has a composition range as follows. The unit is mol %.

$Fe_2O_3$ 47 to 49.5
NiO 15 to 33
ZnO 12 to 28

The range of CuO is, for example, 6 to 12, and set within a range in which calcination at a relatively low temperature of about 900° C. is possible and grain sizes are made small and uniform.

This composition range is the range practically surrounded by an oval A1 in FIG. 9.

At least one of the oxide-based magnetic materials (e.g., Ni—Zn—Cu ferrite-based magnetic material) may contain 0.1 to 1.0 wt % of CoO. Accordingly, temperature characteristics can be stabilized, and a fluctuation of communication characteristics with respect to a temperature change of an environment in which the antenna module 10 or 110 is used can be suppressed. Alternatively, at least one of the oxide-based magnetic materials may contain $Sb_2O_3$.

At least two of the oxide-based magnetic materials are mixed (Step 102), preliminarily calcined (Step 103), and pulverized (Step 104). A temperature of the preliminary calcination is 700 to 800° C., typically 730° C., though not limited thereto.

The pulverized magnetic material is typically dispersed in an organic solvent to be formed into a paste, and the magnetic material is applied onto a film formed of PET, PTT, PBT, or other materials after being subjected to defoaming processing (Step 105). As a result, a sheet-like magnetic material 51 is formed. A thickness of the sheet-like magnetic material 51 is 0.02 to 0.06 mm, typically 0.03 mm, though not limited thereto.

Magnetic particles 52 are formed by cutting the sheet-like magnetic material 51 into predetermined sizes so as to fragment it into particles (Step 106). In this case, as a cutting method, there are a punch-out with a die or cutting by a cutter. Examples of the cutter include a mechanical cutter, a laser cutter, and a cutter that uses a fluid pressure.

Since the magnetic material 51 is formed into a sheet in Step 105, each of the magnetic particles 52 is plate-like though described as particles. A surface shape thereof may be, for example, a circle, an oval, a honeycomb, a polygon of a triangle or more, or other irregular shapes. The predetermined size is, for example, 0.5 to 1.5 mm at a maximum length on the surface, though not limited to this range.

After the cutting, the magnetic particles 52 are preliminarily calcined (Step 107). Accordingly, the magnetic particles 52 having a flexibility are cured. Moreover, the film used in Step 105 above is melted by heat, or the film is peeled off before the preliminary calcination. Furthermore, in Step 107, the organic solvent or the like as the binder is removed. The temperature of the preliminary calcination is about 650 to 750° C., though not limited to this range.

The magnetic particles 52 calcined and cured by the preliminary calcination are barreled (Step 108). Either a dry type or a wet type may be adopted for the barreling, and any of metal, ceramics, ore, liquid, and the like may be used as a grinding medium. Alternatively, instead of the barreling, other well-known grinding methods may be adopted. By such grinding, the magnetic particles 52 are additionally size-reduced and flattened as compared to sizes thereof cut in Step 106. As a result, in a case where the magnetic sheet 18 or 118 is structured using the magnetic particles 53, for example, a density of the magnetic particles 52 included in the magnetic sheet 18 or 118 can be increased, with the result that high magnetic permeability can be achieved.

After the barreling, the magnetic particles 52 are calcined (Step 109). The temperature of the calcination is 850 to 950° C., typically about 900° C., though not limited thereto. As a result, crystals are organized and practical magnetic permeability is determined, and a magnetic powder is thus completed.

As described above, in this embodiment, the magnetic particles 52 are size-reduced and flattened by divisionally cutting the sheet-like magnetic material 51, and calcined after that. As a result, a situation where the magnetic material is deformed during pulverization to thus lower magnetic permeability can be prevented from occurring.

Moreover, since the magnetic material 51 is cut to be fragmented into particles after being formed into a sheet in Step 105, the magnetic material can be size-reduced and flattened before the calcination of Step 109.

Next, the magnetic particles 53 are sorted. The sorting is carried out based on, for example, sizes (maximum lengths or diameters of surfaces of magnetic particles 52) or thicknesses. For example, magnetic particles 53 having a diameter of 0.2 to 0.8 mm are used, though not limited thereto.

Figure 10:
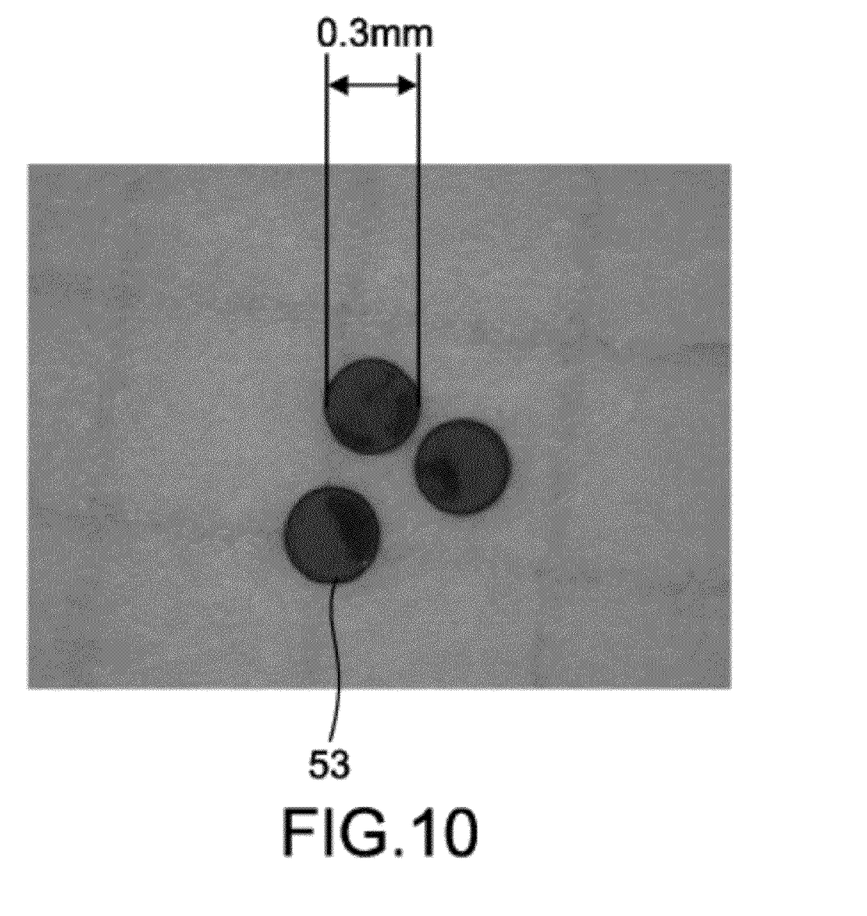
FIG. 10 An enlarged photograph of disc-like magnetic particles (magnetic powder) obtained after calcination (or after barreling), for example.

FIG. 10 is an enlarged photograph of the disc-like magnetic particles 53 (magnetic powder) obtained after the calcination (or after barreling), for example. A diameter of the magnetic particles is about 0.3 mm.

Referring to FIG. 8, the magnetic particles 53 are mixed with a resin (e.g., acryl etc.) and/or rubber after the sorting (Step 111) and formed into a paste. After that, the resultant mixture is applied onto a film formed of PET, PTT, PBT, or the like (Step 112). As a result, a sheet-like magnetic material 54 is formed, and a magnetic sheet having a similar shape as the magnetic sheet 18 or 118 is formed by hot press processing or the like (Step 113). In Step 113, laser processing or other processing methods may be used instead of the press processing. Alternatively, injection molding, extrusion molding, or the like may be adopted instead of the application and the press processing of Steps 112 and 113.

After that, the magnetic sheet is assembled as a part of the antenna module 10 or 110 (Step 114).

Figure 11:
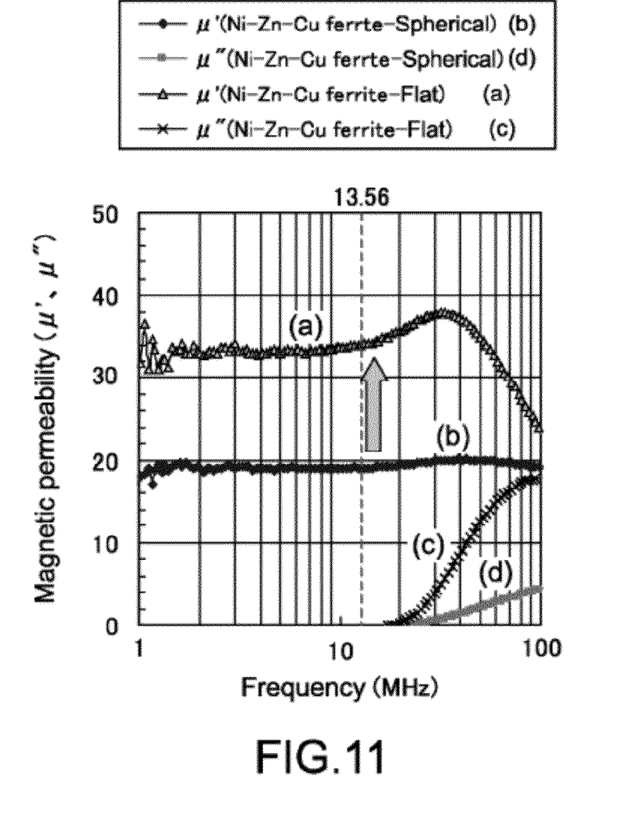
FIG. 11 A graph showing frequency characteristics of $\mu'$ and $\mu''$ of spherical and flat Ni—Zn—Cu ferrite-based magnetic materials obtained by the calcination.
Figure 12:
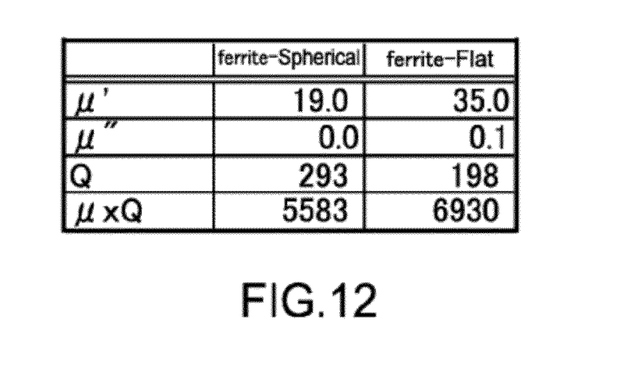
FIG. 12 A table showing original data of the graph shown in FIG. 11.

FIG. 11 is a graph showing frequency characteristics of $\mu'$ and $\mu''$ of spherical and flat Ni—Zn—Cu ferrite-based magnetic materials obtained by the calcination. FIG. 12 is a table showing original data of that graph. Here, the Ni—Zn—Cu ferrite-based magnetic materials were experimented with the following composition. The unit is mol %.

$Fe_2O_3$ 48.00
NiO 21.63
ZnO 22.57
CuO 7.8
$(+CoO+Sb_2O_3)$

Moreover, in the experiment, (b) and (d) of FIG. 11 are $\mu'$ and $\mu''$ of the Ni—Zn—Cu ferrite-based magnetic material in which a particle configuration of the magnetic powder is a sphere (or bulk-like), and (a) and (c) are $\mu'$ and $\mu''$ of the Ni—Zn—Cu ferrite-based magnetic material in which the particle configuration of the magnetic powder is flat. In addition, a diameter (maximum length) of particles of the spherical (or bulk-like) Ni—Zn—Cu ferrite-based magnetic material is about 80 μm in a median or mean value, and a diameter of the flat Ni—Zn—Cu ferrite-based magnetic material is 300 μm.

It can be seen from FIGS. 11 and 12 that in a wide frequency range including 13.56 MHz that is a typically-used frequency, the flat one has a higher $\mu'$ value and a higher performance index ($\mu'*Q$) value than the spherical (or bulk-like) one. Moreover, the result that the value of the magnetic permeability $\mu'$ is 35 or more and the value of $\mu''$ is 0.1 or less was obtained by the experiment.

In other words, according to this embodiment, since the density of the ferrite-based magnetic particles in the magnetic sheet can be increased, high magnetic permeability can be obtained.

Figure 13:
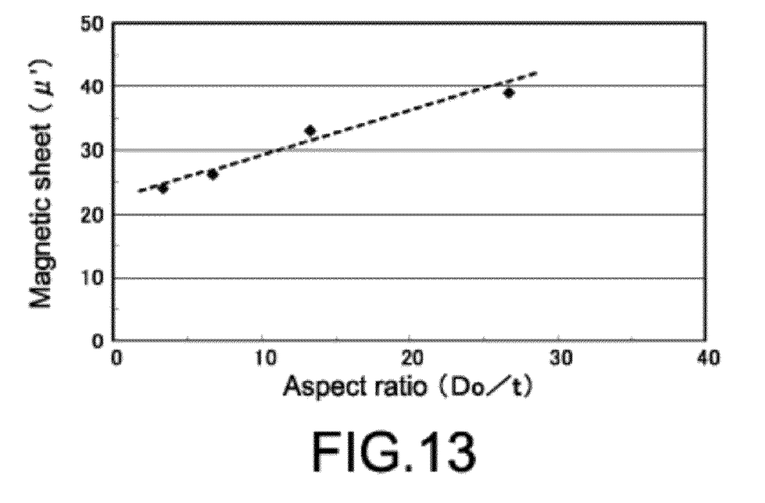
FIG. 13 A graph showing a relationship between an aspect ratio of a flat Ni—Zn—Cu ferrite-based magnetic material and magnetic permeability $\mu'$ of a magnetic sheet.
Figure 14:
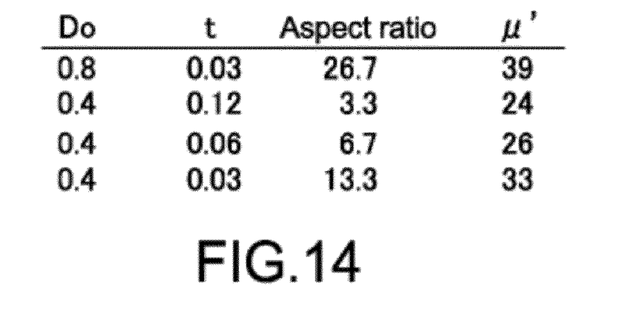
FIG. 14 A table showing original data of the graph shown in FIG. 13.

FIG. 13 is a graph showing a relationship between an aspect ratio of the flat Ni—Zn—Cu ferrite-based magnetic material and the magnetic permeability $\mu'$ of the magnetic sheet, that are practically in a proportional relationship. The aspect ratio is expressed by diameter (Do)/thickness (t). FIG. 14 is a table showing original data of the graph shown in FIG. 13. As a result, magnetic permeability $\mu'$ of 30 or more was obtained with the aspect ratio of about 15 or more.

Figure 15:
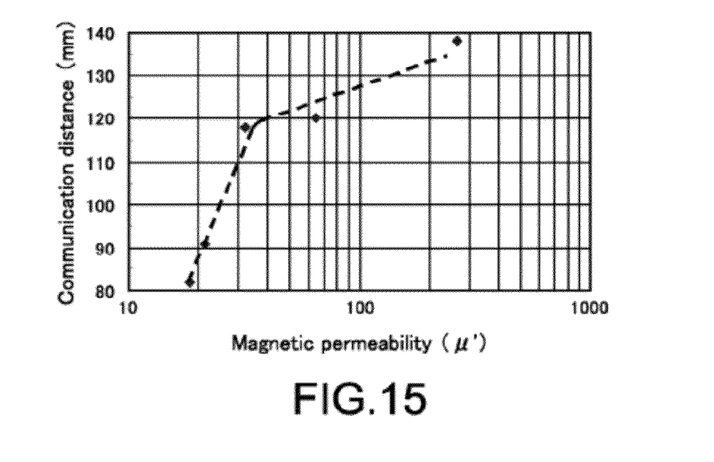
FIG. 15 A graph showing a relationship between the magnetic permeability $\mu'$ of the flat Ni—Zn—Cu ferrite-based magnetic material and a communication distance thereof.

FIG. 15 is a graph showing a relationship between the magnetic permeability $\mu'$ of the flat Ni—Zn—Cu ferrite-based magnetic material and a communication distance thereof. Assuming a case where an IC tag is actually used, the communication distance is desirably 90 mm or more or 100 mm or more. Therefore, based on the graph, the magnetic permeability $\mu'$ is desirably 20 or more, 22 or more, or 30 or more. For example, when the magnetic permeability $\mu'$ of 30 or more is desired, the aspect ratio only needs to be about 15 or more as described above based on the result of FIG. 13.

Figure 16:
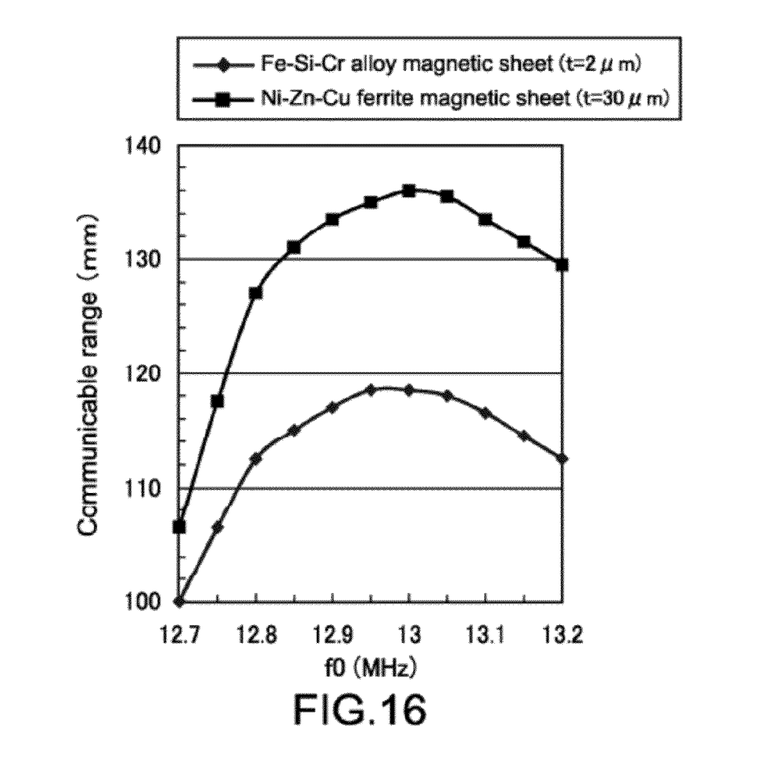
FIG. 16 A graph showing a communicable range in a case where a resonance frequency (f0) is varied with respect to the Ni—Zn—Cu ferrite-based magnetic material and a current metal-based magnetic material.

FIG. 16 is graph showing a communicable range in a case where a resonance frequency (f0) is varied with respect to the Ni—Zn—Cu ferrite-based magnetic material and a current metal-based magnetic material. The current metal-based magnetic material is a Fe—Si—Cr alloy magnetic sheet that is used for an antenna for an IC tag of a current cellular phone. In the graph, the Ni—Zn—Cu ferrite-based magnetic material is a magnetic sheet having a thickness of 30 μm, and the current metal-based magnetic material is a magnetic sheet having a thickness of 2 μm. It was confirmed that the communicable range of the Ni—Zn—Cu ferrite-based magnetic material is larger than that of the current metal-based magnetic material in the entire frequency range.

The embodiment of the present invention is not limited to the above embodiment, and various other embodiments are also possible.

The descriptions on FIG. 9 and the subsequent figures have been given on the Ni—Zn—Cu ferrite-based magnetic material. However, the same tendency as the Ni—Zn—Cu ferrite-based magnetic material can be seen in an Ni—Zn ferrite-based magnetic material, an Mn—Zn ferrite-based magnetic material, and the like.

DESCRIPTION OF REFERENCE NUMERALS 10, 110 antenna module
15, 115 antenna coil
18, 118 magnetic sheet
51 sheet-like magnetic material
52, 53 magnetic particle
54 magnetic material (magnetic powder)

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A magnetic powder production method, comprising:
   forming a magnetic material including at least two types of oxide-based magnetic materials into a sheet;
   forming magnetic particles by cutting the magnetic material formed into the sheet such that the magnetic material is fragmented into particles; and
   calcining the magnetic particles;
   grinding the magnetic particles between the forming of the magnetic particles and the calcining of the magnetic particles; and
   wherein the grinding of the magnetic particles is carried out by barreling.

2. A magnetic powder production method comprising:
   forming a magnetic material including at least two types of oxide-based magnetic materials into a sheet;
   forming magnetic particles by cutting the magnetic material formed into the sheet such that the magnetic material is fragmented into particles; and
   calcining the magnetic particles;
   grinding the magnetic particles between the forming of the magnetic particles and the calcining of the magnetic particles; and
   wherein the oxide-based magnetic material is a ferrite-based magnetic material including $Fe_2O_3$ and includes at least one of NiO, CuO, ZnO, $MnO_2$, CoO, and $Sb_2O_3$.

* * * * *

UNITED STATES PATENT AND TRADEMARK OFFICE
CERTIFICATE OF CORRECTION

| | |
|---|---|
| PATENT NO. | : 8,246,849 B2 |
| APPLICATION NO. | : 12/740210 |
| DATED | : August 21, 2012 |
| INVENTOR(S) | : Hiraku Akiho |

It is certified that error appears in the above-identified patent and that said Letters Patent is hereby corrected as shown below:

Title Page; item (75), in the "Inventor" section, please replace

"Hiraku Akiho, Tokyo (JP)" with -- Hiraku Akiho, Miyagi (JP) --.

Signed and Sealed this
Twenty-ninth Day of October, 2013

Teresa Stanek Rea
*Deputy Director of the United States Patent and Trademark Office*